(12) United States Patent
Bartlett et al.

(10) Patent No.: US 9,158,648 B2
(45) Date of Patent: Oct. 13, 2015

(54) REPORTING PRODUCT STATUS INFORMATION USING A VISUAL CODE

(75) Inventors: David B Bartlett, Hopewell Jct., NY (US); James C Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 13/616,339

(22) Filed: Sep. 14, 2012

(65) Prior Publication Data

US 2014/0082430 A1 Mar. 20, 2014

(51) Int. Cl.
*G06F 11/00* (2006.01)
*G06F 11/32* (2006.01)
*G06F 11/30* (2006.01)
*G06F 11/07* (2006.01)

(52) U.S. Cl.
CPC .......... *G06F 11/324* (2013.01); *G06F 11/0709* (2013.01); *G06F 11/0772* (2013.01); *G06F 11/3055* (2013.01)

(58) Field of Classification Search
USPC ............................................... 714/26, 48, 57
See application file for complete search history.

(56) References Cited

U.S. PATENT DOCUMENTS

2010/0325490 A1* 12/2010 Anvin et al. .................... 714/37
2012/0131416 A1* 5/2012 Dugan et al. .................. 714/760
2012/0198288 A1* 8/2012 Njo et al. ......................... 714/48
2013/0166969 A1* 6/2013 Zhang et al. ..................... 714/57
2013/0169996 A1* 7/2013 McLeod et al. .............. 358/3.28
2014/0025992 A1* 1/2014 DeRoos et al. ................. 714/25
2014/0085309 A1* 3/2014 Czapar, Matthew .......... 345/441

FOREIGN PATENT DOCUMENTS

JP 2004265317 9/2004
JP 2008275545 11/2008
JP 2009140204 6/2009

OTHER PUBLICATIONS

"Create a Specific QR Code From Product Error Messages That Could Be Scanned Into a Device and Used for Support" ip.com, IPCOM000199891D, (Sep. 20, 2010), 2 pages.

* cited by examiner

*Primary Examiner* — Yolanda L Wilson
(74) *Attorney, Agent, or Firm* — Jeffrey T. Holman

(57) ABSTRACT

A system facilitates reporting product status information using a visual code. The system includes a code generator and a communication device. The code generator reports a product status with aggregate information in a visual code. In order to achieve this functionality, the code generator recognizes a status event trigger for a product. The code generator also compiles the aggregate information in response to the status event trigger for the product. The aggregate information includes product status information and product identification information. The code generator also generates the visual code representative of the aggregate information. The communication device facilitates communication of the visual code to a user.

18 Claims, 7 Drawing Sheets

REPORTING PRODUCT STATUS INFORMATION USING A VISUAL CODE

BACKGROUND

Error reporting functions are often process intensive for operators of the failed equipment. When systems such as computer systems, televisions, and other systems fail, the reporting process for the failure typically encompasses calling the responsible company and providing a set of information to the company about the failing product (e.g., the serial, model number, etc.), the registered owner (e.g., required or provided for warranty services), and any error messages provided at the time of the failure. This conventional method of reporting is time consuming and error prone. Many conventional systems require the completion of personal identifying information as part of product registration so the information has been previously collected.

Some systems implement error reporting methods that utilize barcodes to transmit the error information to a user or customer service representative. Various types of one-dimensional (1D) and two-dimensional (2D) barcodes exist. A quick response (QR) barcode is a 2D barcode that is capable of storing a relatively large amount of data, compared with traditional 1D barcodes. Some conventional systems propose reporting error message information using a QR barcode that is displayed to a user. The user can then take a photograph of the image and subsequently transmit the image of the barcode to the customer service representative, who is able to decode and retrieve the error message information from the QR barcode. While the use of a QR code may be helpful to consolidate information, the type of information included in conventional error reporting methods is limited to a collection of the failure information itself.

SUMMARY

Embodiments of a system are described. In one embodiment, the system facilitates reporting product status information using a visual code. One embodiment of the system includes a code generator and a communication device. The code generator reports a product status with aggregate information in a visual code. In order to achieve this functionality, the code generator recognizes a status event trigger for a product. The code generator also compiles the aggregate information in response to the status event trigger for the product. The aggregate information includes product status information and product identification information. The code generator also generates the visual code representative of the aggregate information. The communication device facilitates communication of the visual code to a user. Other embodiments of the system are also described. Embodiments of corresponding methods, computer program products, and other implementations are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
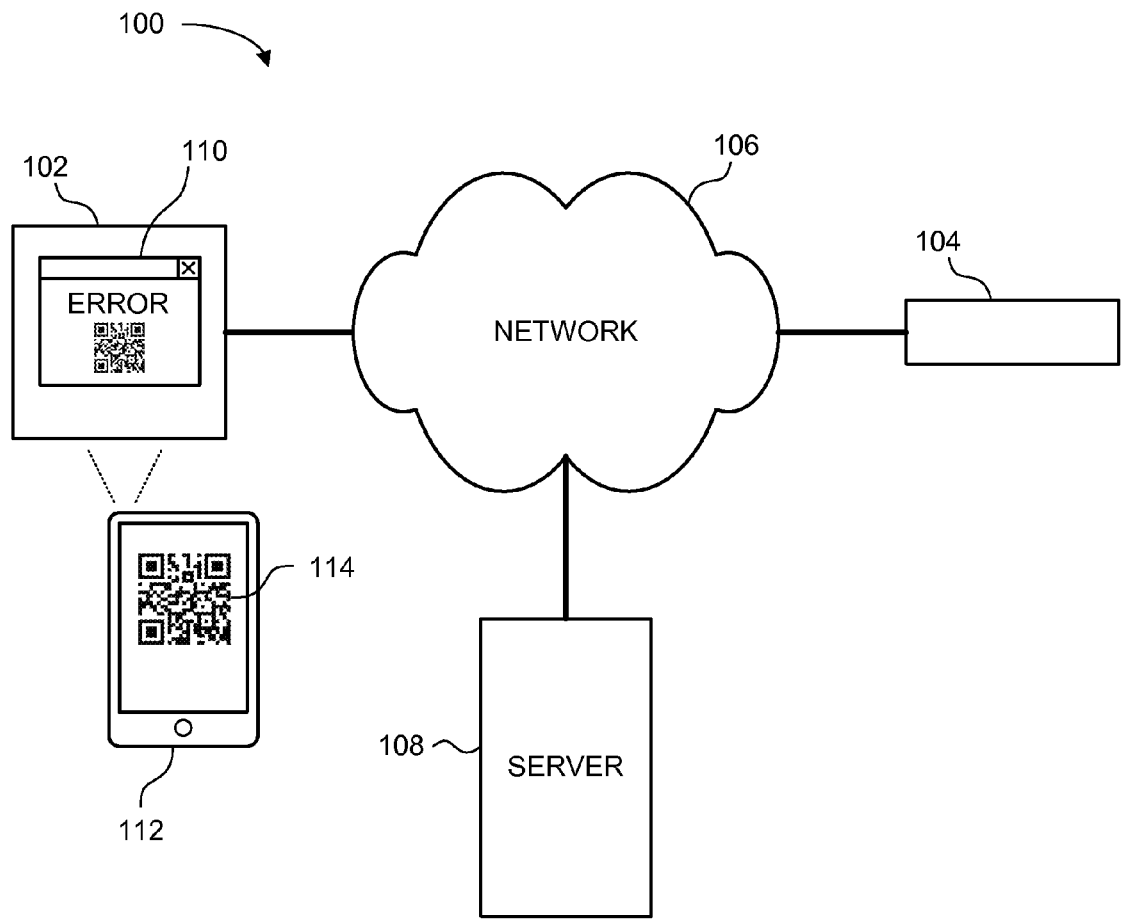
FIG. 1 depicts a schematic diagram of one embodiment of a network communication environment.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate collection and transmission of product status information using a visual code. With the advent of technologies such as quick response (QR) codes, information can be collected and aggregated into a QR code image. This information can be retained in the QR code form that is humanly non-readable, but which can be easily collected using a digital camera and transmitted as a photo, or electronically transmitted as an image. As this technology is leveraged by a device that is failing or makes status information available, various types of information can be collected and placed within the QR image. This information may include, but is not limited to information about the owner, the responsible person, the failure, the product identification, and so forth.

The image of the visual code, which contains all necessary information (or a predetermined amount of information) in a consolidated form, can then be transmitted to various devices and/or users. For instance, the image information could be collected from a screen image or, if connected to a network, transmitted directly as a single image document. The consolidated format could change how problems are reported and resolved. Additionally, other product status information may be tracked and utilized. This may facilitate a decrease in error rates and time spent identifying and resolving issues related to products which aggregate and make information accessible through the use of QR codes or other visual codes.

FIG. 1 depicts a schematic diagram of one embodiment of a network communication environment 100. The illustrated network communication environment 100 includes a first user device 102 and a second user device 104 coupled together via a network 106. The first and second user devices 102 and 104 represent any type of electronic device attached to any type of network. Some examples of such user devices include, but are not limited to, personal computers, television sets, other audio/video equipment, networking equipment, and so forth. A server 108 is also coupled to the network 106. The network 106 may be any type of wired and/or wireless computer network, or a combination of networks, which facilitates communications among two or more of the nodes (e.g., devices 102 and 104 and server 108) coupled to the same network 106 or combination of networks. Although the network communication environment 100 is shown and described with certain components and functionality, other embodiments of the network communication environment 100 may include fewer or more components to implement less or more functionality.

In one embodiment, the first user device 102 facilitates communication of product status information 110 for one or more of the devices 102, 104, 108 coupled to the network 106. The product status information 110 may be related to an operating error experienced by one of the devices 102, 104, 108. Alternatively, the product status information 110 may be related to another status trigger or event. For example, the product status information 110 may be related to a notification of available firmware/software upgrades for a device, or for completion of newly installed firmware/software upgrades. In other embodiments, the product status information 110 may relate to any other type of information related to one or more of the devices 102, 104, 108. Although referred to as product status information 110 here, the description below of FIG. 2 provides examples of other types of information that may be included with the product status information 110.

The illustrated network communication environment 100 also includes a mobile device 112. In one embodiment, the first user device 102 makes the product status information 110 available to the mobile device 112. As one example, the first user device 102 may display a visual code, encoded with the product status information 110, for image capture by a camera function on the mobile device 112. As another example, the first user device 102 may transmit electronic data representative of the visual code and the product status information 110 to the mobile device 112. The mobile device 112 then may store and/or display the visual code 114.

Figure 2:
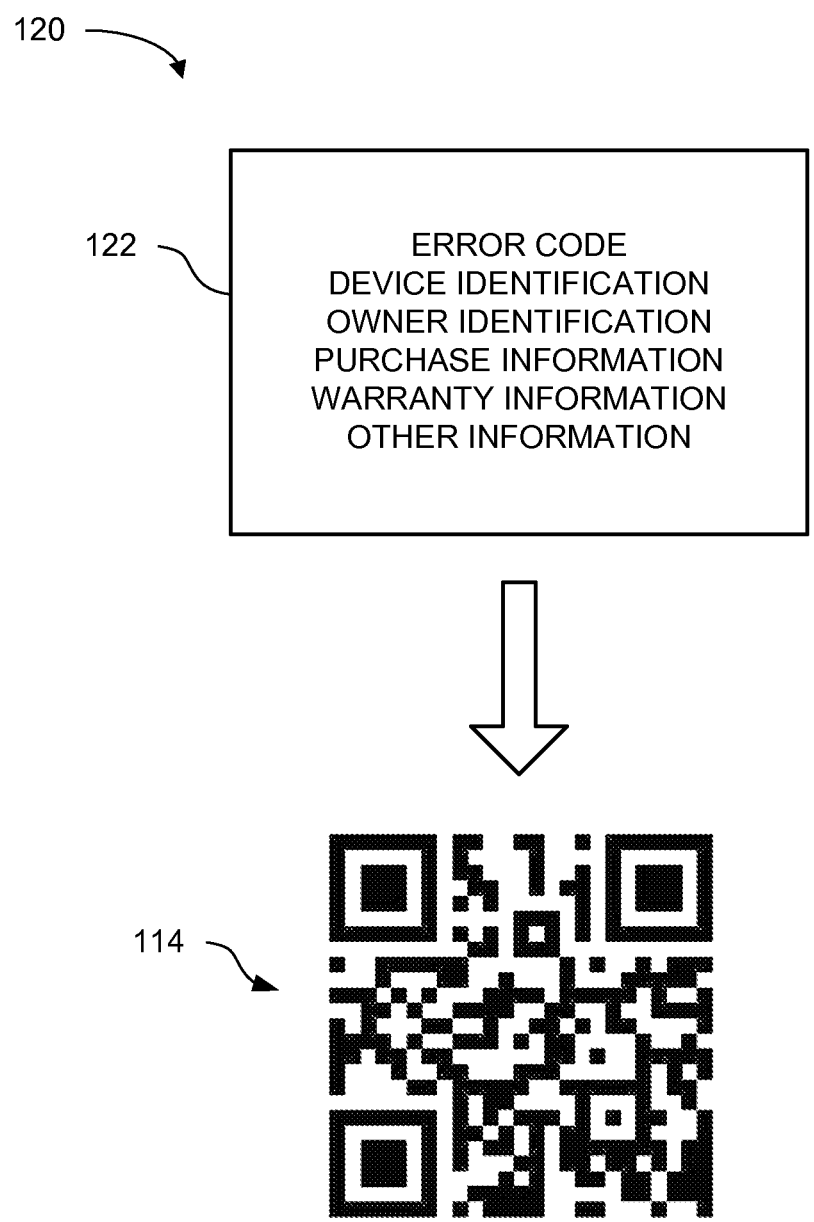
FIG. 2 depicts a schematic diagram of one embodiment of a visual code which embeds certain information related to a product, a status of a product, and/or an owner of a product.

FIG. 2 depicts a schematic diagram 120 of one embodiment of a visual code 114 which embeds certain information 122 related to a product, a status of a product, and/or an owner of a product. In the illustrated embodiment, the information 122 that is encoded in the visual code 114 includes error code information, device identification information, owner identification information, purchase information, warranty information, and other information.

The error code information may include one or more error codes related to an error status of the applicable product. Such error codes are often used to classify and identify different types of errors that occur on electronic devices such as personal computers, set top boxes, and other types of devices which include, or are connected to, a visual display device such as a display screen. Error codes also may be generated by and/or for devices which do not have, or are not directly connected to, a visual display device.

The device identification may include one or more device identifiers such as a serial number, a model number, a media access code (MAC) address, an internet protocol (IP) address, and so forth. The device identification information may facilitate uniquely identifying the applicable device relative to other types of products or other specific devices coupled to the same network or within a series of devices that are known to be in public/private use.

The owner identification information may include any information that is available about the owner of the applicable device. The owner information may include contact information such as name, residence, mailing address, phone number, email address, and so forth. In some embodiments, the owner information is available as part of product registration information for the applicable product or type of product. The product registration information may be stored locally, remotely within the network communication system 100, or remotely at a product manufacturer's or representative's data storage site. In the case of local storage, the product registration information may be accessed locally and encoded within the visual code 114. In the case of remote storage, some or all of the product registration information may be retrieved from the remote storage location prior to encoding the visual code 114 with the retrieved information.

The purchase information and the warranty information similarly may be stored locally or remote and, upon retrieval, may be encoded in the visual code 114. The purchase information may indicate a date, time, location, price, etc. of the original purchase of the applicable product. The warranty information may indicate the existence of a warranty and/or extended warranty for the applicable product, as well as any prior warranty use, remaining warranty term, and so forth.

Figure 3:
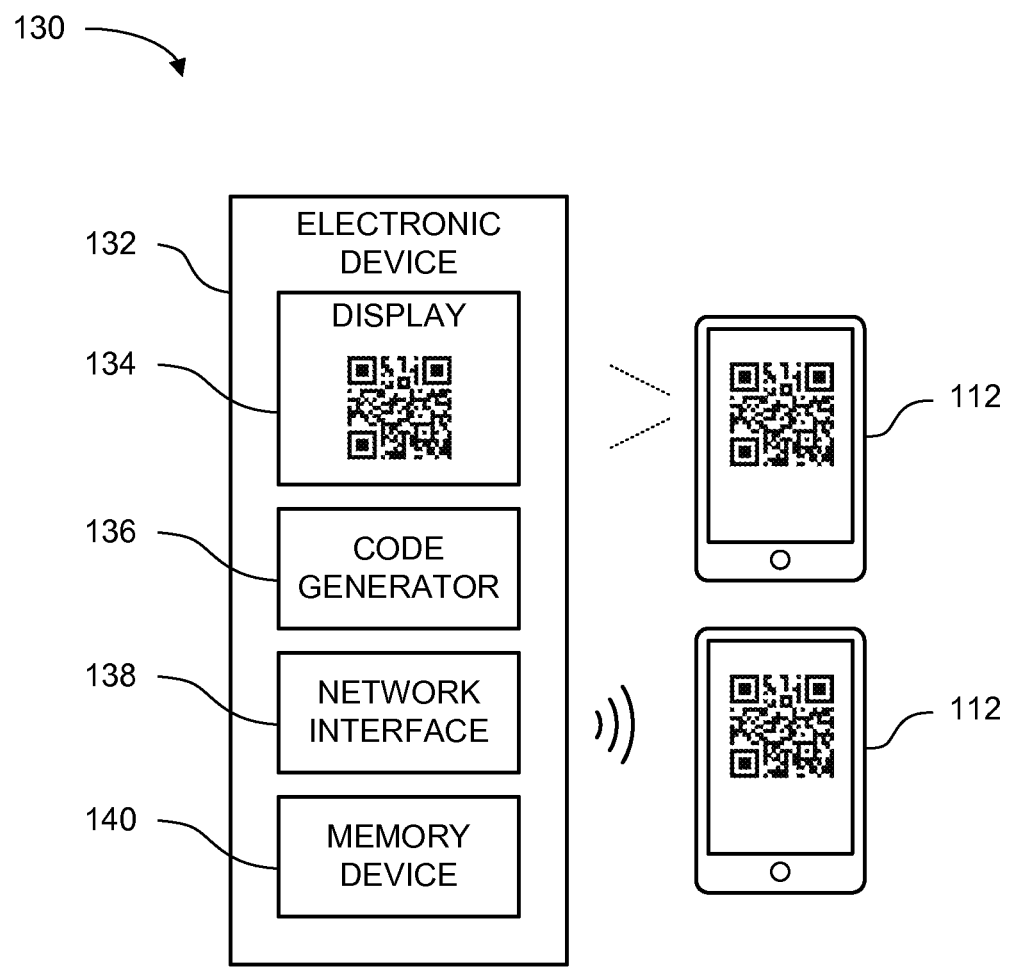
FIG. 3 depicts a schematic diagram of one embodiment of a communication system.

FIG. 3 depicts a schematic diagram of one embodiment of a communication system 130. Although the communication system 130 is described in conjunction with the network communication environment 100 of FIG. 1, embodiments of the communication system 130 may be implemented with other types of network communication environments.

The illustrated communication system includes an electronic device 132 and one or more mobile devices 112. The illustrated electronic device 132 is representative of the first user device 102 or the second user device 104 shown in FIG. 1 and described above. The depicted electronic device 132 includes a display device 134, a code generator 136, a network interface 138, and a memory device 140. Other embodiments of the electronic device 132 may include fewer or more components to perform less or more functionality.

In one embodiment, the display device 134 may be any type of device capable of generating and emitting a visual image. Some examples of various display devices 134 include, but are not limited to, computer screens, television screens, projectors, touch screens, etc. In the depicted embodiment, the display device 134 displays an image of a visual code. By displaying an image of the visual code, the mobile device 112 is able to capture an image of the visual code for storage and/or display at the mobile device 112. The mobile device may be a cellular telephone, a tablet, a personal digital assistant, a digital camera, or any other type of electronic device capable of capturing and storing and/or displaying an image of the visual code.

In one embodiment, the code generator 136 is software implemented on a hardware platform to generate a visual code to electronically represent the product status information 110 and/or other information 122. The code generator 136 may be capable of generating a single type of visual code or multiple types of visual codes. Although several examples described herein refer to QR codes, other embodiments may use different types of bar, matrix, color, or other visual codes. The use of visual codes that are not readily decipherable by human users may be beneficial to limit problems that might arise if users were to access and/or distribute the content encoded within the visual code(s). The use of visual codes also simplifies communications of various types of information in a consolidated form. In this way, a technician analyzing the status of a product may receive all of the available information in a compact format, and there is no significant risk that a user may have altered, changed, or omitted some of the available information. Additionally, encryption and error detection and correction processes may be simplified by transmitting an electronic representation of a single visual code, as opposed to various data from different fields and/or sources.

Also, the ability to aggregate certain information together within the same visual code can be beneficial. In one embodiment, the code generator 136 compiles aggregate information which includes product status information as well as product identification information. In other embodiments, the code generator 136 may compile additional information to include with the product status information and the product identification information.

In one embodiment, the network interface 138 provides a physical and/or operable coupling to other components within the network. The network interface 138 may include a receptacle to accept a wired network connection. Alternatively, or in addition to a wired network connection, the network interface 138 may include an antenna structure (e.g., transmitter and/or receiver, or transceiver) to send/receive wireless communications to/from other components within the network communication environment 100. In the depicted embodiment, the network interface 138 includes a wireless transmitter to transmit wireless signals to the mobile device 112 in order to communicate the visual code to the mobile device 112.

In one embodiment, the memory device 140 includes storage locations to store data and/or software instructions for carrying out the operations described herein. For example, the memory device 140 may store an electronic representation of the visual code that is generated by the code generator 136.

Figure 4:
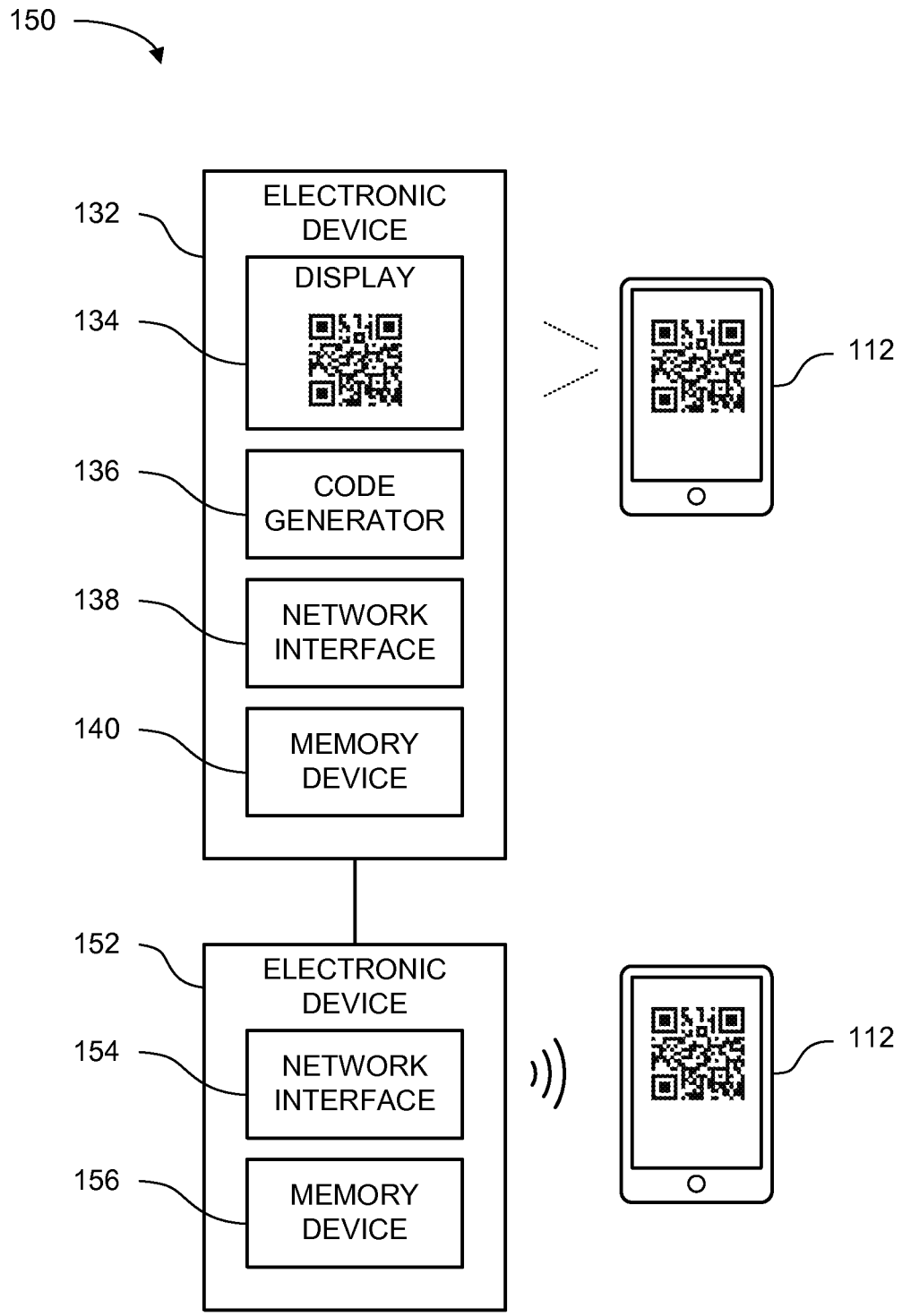
FIG. 4 depicts a schematic diagram of another embodiment of a communication system.

FIG. 4 depicts a schematic diagram of another embodiment of a communication system 150. In many ways, the communication system 150 of FIG. 4 is substantially similar to the communication system 130 of FIG. 3. However, the communication system 150 also includes a second electronic device 152 which is operably coupled to the first electronic device 132.

The second electronic device 152 includes a network interface 152 and a memory device 140. The second electronic device 152 does not include an integrated display. Therefore, the second electronic device 152, by itself, cannot display a visual code. Nevertheless, in some embodiments, the second electronic device 152 is capable of sending pertinent information to the first electronic device 132. The code generator 136 of the first electronic device 132 generates a corresponding visual code, and the display device 134 may display the code for access by the mobile device 112. In a further embodiment, the first electronic device 132 may transmit an electronic representation of the visual code (generated by the code generator 136) to the second electronic device 152, so that the second electronic device 152 can transmit an electronic representation of the visual code to a mobile device 112 for display. Thus, there are embodiments which facilitate the generation and display of visual codes for devices which do not have integrated generation and display capabilities.

Figure 5:
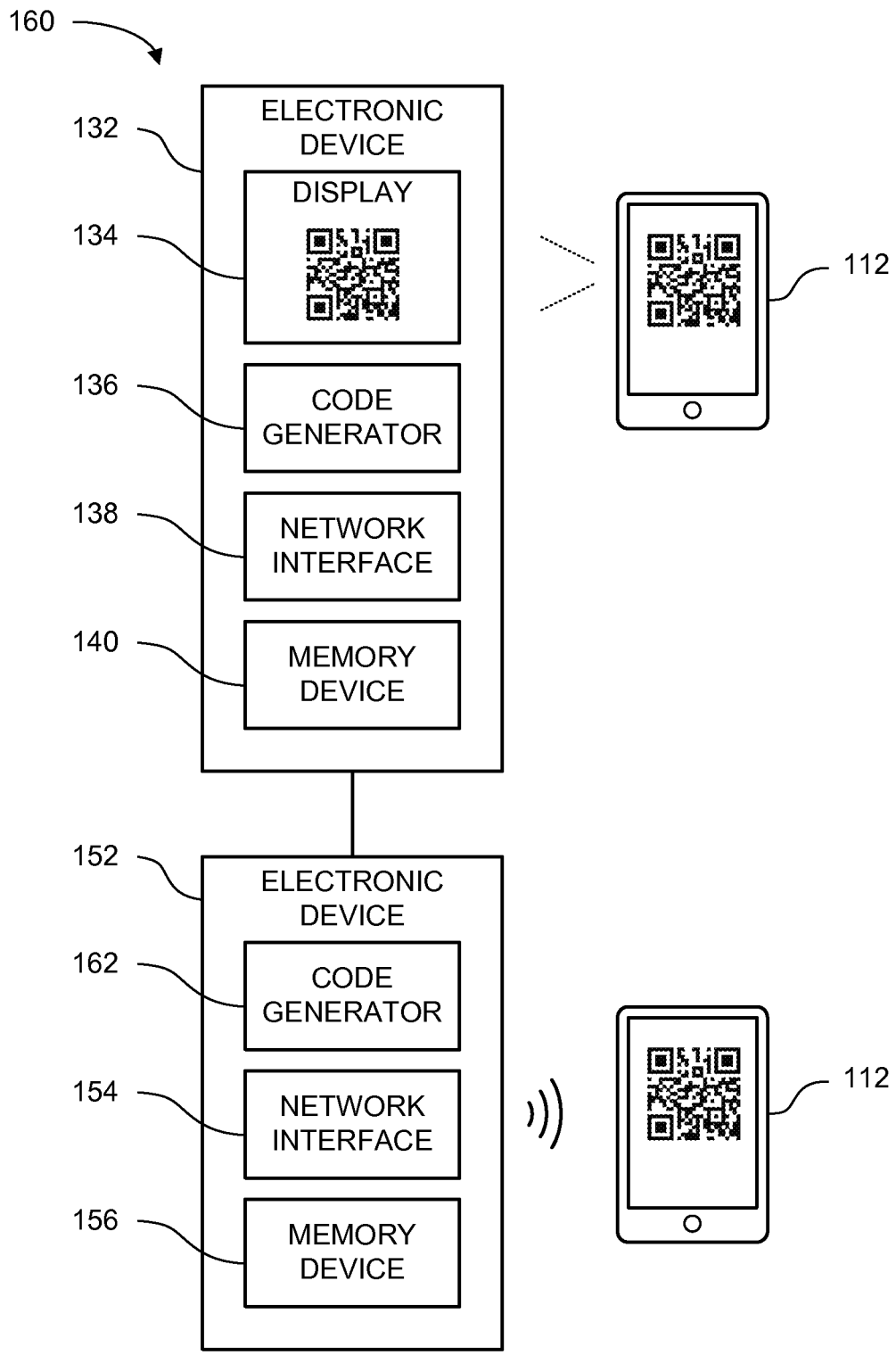
FIG. 5 depicts a schematic diagram of another embodiment of a communication system.

FIG. 5 depicts a schematic diagram of another embodiment of a communication system 160. In many ways, the communication system 160 of FIG. 5 is substantially similar to the communication system 150 of FIG. 4. However, in the communication system 160 of FIG. 5, the second electronic device 152 also includes and integrated code generator 162. This makes it possible for the second electronic device 152 to locally generate the visual code, instead of relying on the code generator 136 of the first electronic device 132.

Figure 6:
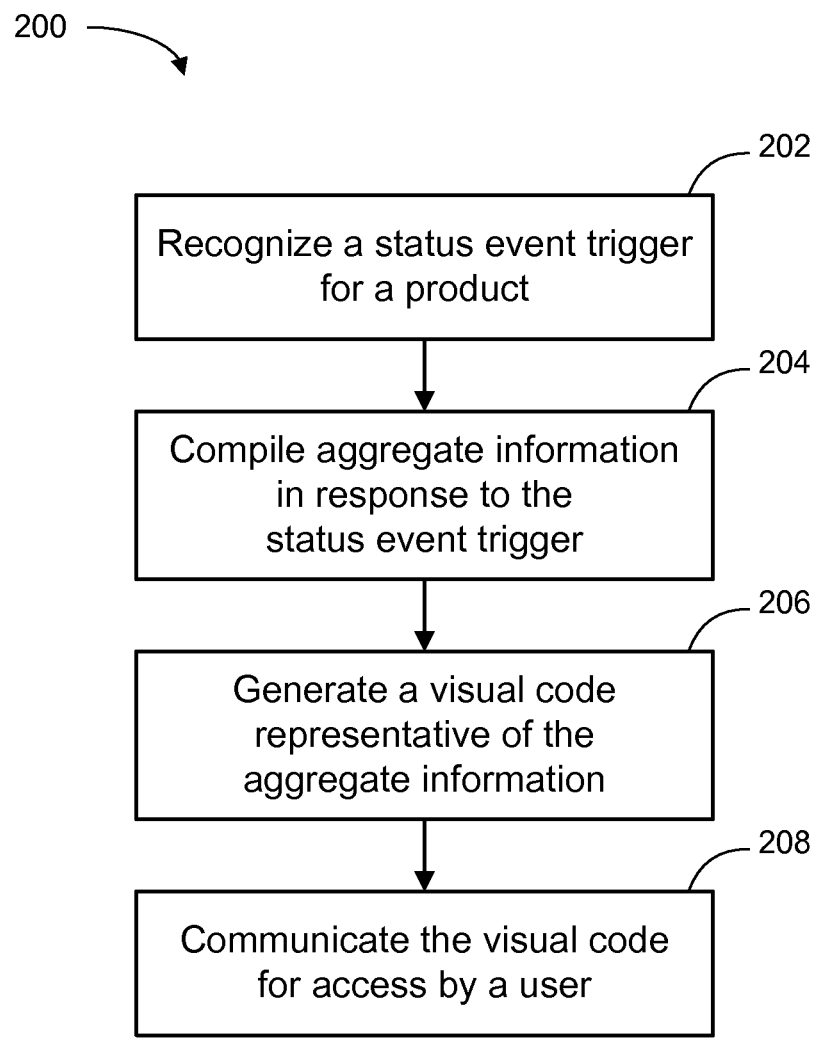
FIG. 6 depicts one embodiment of a method for reporting product status information using a visual code.

FIG. 6 depicts one embodiment of a method 200 for reporting product status information using a visual code. Although the method 200 is described in conjunction with the network communication environment 100 of FIG. 1, embodiments of the method 200 may be implemented with other types of network communication environments.

The depicted method begins as a device recognizes 202 a status event trigger for a product. The status event trigger may be any type of event or action which prompts the code generator 136 to generate a visual code with encoded information. As explained above and shown in FIG. 3, the device which recognizes the status event trigger may be the same as the product which experiences the corresponding event or action. Alternatively, as shown in FIGS. 4 and 5, the device which recognizes the status event trigger may be different from, but in communication with, the product which experiences the corresponding event of action.

The device then compiles 204 aggregate information in response to the status event trigger. The aggregate information includes product status information and product identification information. In some embodiments, additional information also may be included. The code generator 136 then generates a visual code representative of the aggregate information. And the network interface 138 and/or the display device 134 communicate the visual code for access by a user. The depicted method 200 then ends.

In further embodiments, the method may include additional operations. In some embodiments, the method also includes displaying the visual code on a display device to communicate the visual code to the user. In some embodiments, the method also includes transmitting the visual code from a first device over a network to a separate user device to communicate the visual code to the user. In some embodiments, the aggregate information further comprises product registration information associated with a registered user. In some embodiments, the status event trigger includes an error indication, and the product status information includes error diagnostic information. In some embodiments, the product status information further includes a link to access contact information for a product inquiry. In some embodiments, the product identification information comprises a link to at least one online resource available for the product. In some embodiments, recognizing the status event trigger for the product further includes receiving at a first device an error signal from a second device. In this example, the second device includes the product, and the first and second devices are each operably connected to a communication network.

In further embodiments, when a failure is detected at a device or product, the system accumulates the required information and produces a QR code image. That image is displayed on a visual device (the same device or a different device) where it can be transmitted to the appropriate party for action. There are varying instantiations, including, but not limited to, the failing device could sent the QR image to a user's smartphone, or the failing device could display the image on its own screen where it could be digitally captured by a camera or other imaging device. In further embodiments, the method for reporting product failure information utilizing QR or other visual codes includes receiving a problem indication (e.g., an operational abnormality, or out-of-expected range characteristic) for a product; and responsive to receiving the problem indication for the product, then aggregating information identifying the product, aggregating information identifying the problem (e.g., a first failure diagnostic log), providing any known registration information such as customer name, producing a QR or other visual code image to identify information related to the product and the problem; and providing access to the QR or other visual code image which identifies the product and the problem. In further embodiments, the access to the QR is facilitated through display of the image or transmission of the code. In further embodiments, identifying information related to the product includes one or more items selected from the group consisting of a product model, a product serial number, a set of purchase information, a set of owner information. In further embodiments, identifying product failure information includes error diagnostic information such as component failure, failure rate, captured first failure log trace data, and so forth. Other embodiments of the method include operations of functionality presented in other examples herein.

The embodiments described herein may be implemented within various types of electronic systems. For example, some embodiments may be implemented in next generation television sets, media devices, and other systems or system components that have internet connectivity or shared access to visual media where a visual code could be displayed or otherwise visualized.

Figure 7:
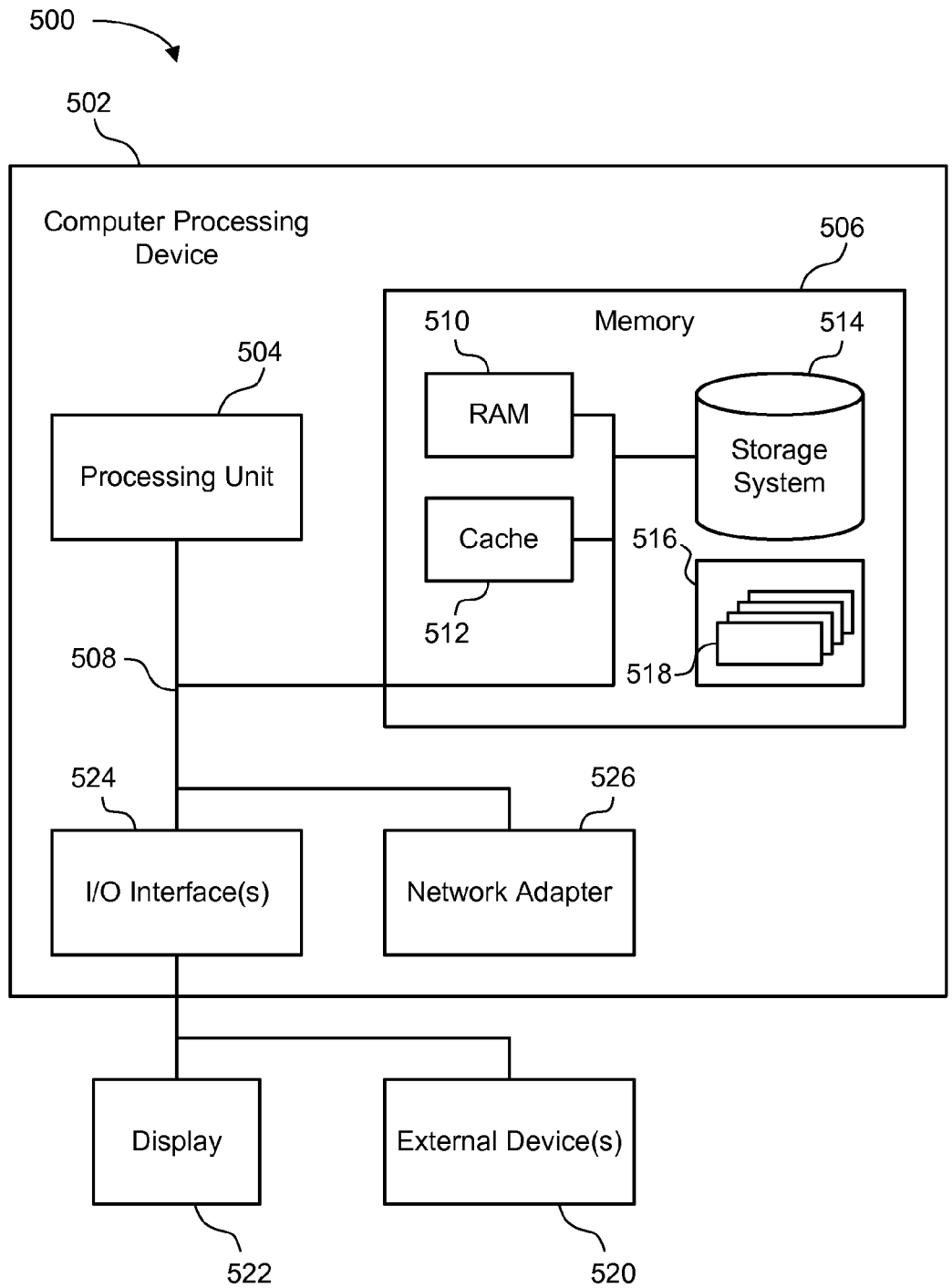
FIG. 7 depicts one embodiment of a computer system for use in one or more embodiments described herein.

FIG. 7 depicts one embodiment of a computer system 500 for use in one or more embodiments described herein. The illustrated computer system 500 is only one example of a suitable computer architecture and is not intended to suggest any limitation as to the scope of use or functionality of embodiments of the invention described herein. Regardless, the computer system 500 is capable of being implemented to performing any or all of the functionality set forth hereinabove.

The depicted computer system 500 includes a computer processing device 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer processing device 502 may be described in the general context of computer system-executable instructions, such as program modules, being executed by a computer system. Generally, program modules may include routines, programs, objects, components, logic, data structures, and so on that perform particular tasks or implement particular abstract data types. Embodiments of the computer processing device 502 may be practiced locally, remotely, or in distributed cloud computing environments where tasks are performed by remote processing devices that are linked through a communications network. In a distributed cloud computing environment, program modules may be located in both local and remote computer system storage media including memory storage devices.

In one embodiment, the computer processing device 502 includes components and functionality typical of a general-purpose computing device. The components of the computer processing device 502 may include, but are not limited to, one or more processors or processing units 504, a system memory 506, and a bus 508 that couples various system components including the system memory 506 to the processor 504.

The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer processing device 502 typically includes a variety of computer system readable media (also referred to as computer readable media and/or computer usable media). Such media may be any available media that is accessible by the computer processing device 502. Embodiments of the computer readable media may include one or more of the following types of media: volatile and non-volatile media, removable and non-removable media.

The system memory 506 can include computer system readable media in the form of volatile memory, such as random access memory (RAM) 510 and/or cache memory 512. The computer processing device 502 may further include other removable/non-removable, volatile/non-volatile computer system storage media. By way of example only, a storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 508 by one or more data media interfaces. As will be further depicted and described below, the memory 506 may include at least one program product having a set (e.g., at least one) of program modules that are configured to carry out the functions of embodiments of the invention.

In some embodiments, a program/utility 516, having a set (at least one) of program modules 518, is stored in the memory 506. The program modules 518 generally carry out one or more of the functions and/or methodologies of the embodiments described herein. The memory 506 also may store an operating system, one or more application programs, other program modules, and/or program data. Each of the operating system, one or more application programs, other program modules, and program data or some combination thereof, may include an implementation of a personal computer and/or networking environment.

The computer processing device 502 may also communicate with one or more external devices 520 such as a keyboard, a pointing device, a display 522, etc.; one or more devices that enable a user to interact with the computer processing device 502; and/or any devices (e.g., network card, modem, etc.) that enable the computer processing device 502 to communicate with one or more other computing devices. Such communication can occur via input/output (I/O) interfaces 524. Additionally, the computer processing device 502 can communicate with one or more networks such as a local area network (LAN), a general wide area network (WAN), and/or a public network (e.g., the Internet) via a network adapter 526. As depicted, the network adapter 526 communicates with the other components of the computer processing device 502 via the bus 508. It should be understood that, although not shown, other hardware and/or software components could be used in conjunction with embodiments of the computer processing device 502. Examples, include, but are not limited to: microcode, device drivers, redundant processing units, external disk drive arrays, RAID systems, tape drives, and data archival storage systems, etc.

An embodiment of a system includes at least one hardware component coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising:
a non-transitory computer readable storage medium to store a computer readable program that, when executed on a computer, causes the computer to perform operations for reporting a product status with aggregate information in a visual code, wherein the operations comprise:
recognizing a status event trigger for a product;
sending a signal comprising the status event trigger to a first device from a second device, wherein the second device comprises the product, and wherein the first device comprises a mobile device;
compiling the aggregate information in response to receiving the status event trigger in the signal at the first device, wherein the aggregate information comprises product status information and product identification information and further comprises product registration information associated with a registered user; and
generating the visual code representative of the aggregate information at the first device.

2. The computer program product of claim 1, wherein the computer readable program, when executed on the computer, causes the computer to perform further operations comprising:
  displaying the visual code on a display device to communicate the visual code to the user.

3. The computer program product of claim 1, wherein the computer readable program, when executed on the computer, causes the computer to perform further operations comprising:
  transmitting the visual code from the first device over a network to a separate user device to communicate the visual code to the user.

4. The computer program product of claim 1, wherein the status event trigger comprises an error indication, and the product status information comprises error diagnostic information.

5. The computer program product of claim 4, wherein the product status information further comprises a link to access contact information for a product inquiry.

6. The computer program product of claim 1, wherein the product identification information comprises a link to at least one online resource available for the product.

7. The computer program product of claim 1, wherein the first and second devices are each operably connected to a communication network.

8. A system comprising:
  a code generator at a first device to report a product status with aggregate information in a visual code, wherein the code generator is configured to:
    recognize a status event trigger sent to the first device for a product at a second device, wherein the first device is a mobile device;
    compile the aggregate information in response to receiving the status event trigger at the first device for the product at the second device, wherein the aggregate information comprises product status information and product identification information and further comprises product registration information associated with a registered user; and
    generate the visual code representative of the aggregate information; and
  a communication device coupled to the code generator, the communication device to facilitate communication of the visual code to a user.

9. The system of claim 8, wherein the communication device comprises a display device, wherein the display device is configured to display a representation of the visual code.

10. The system of claim 8, wherein the communication device comprises a network interface device, wherein the network interface device is configured to transmit an electronic representation of the visual code over a network to another device for display of the visual code to the user.

11. The system of claim 8, wherein the status event trigger comprises an error indication, and the product status information comprises error diagnostic information.

12. The system of claim 11, wherein the product status information further comprises a link to access contact information for a product inquiry.

13. The system of claim 8, wherein the product identification information comprises a link to at least one online resource available for the product.

14. The system of claim 8, wherein the code generator and the product are each operably connected to a communication network.

15. A method comprising:
  recognizing a status event trigger for a product;
  sending a signal comprising the status event trigger to a first device from a second device, wherein the second device comprises the product, and wherein the first device comprises a mobile device;
  compiling aggregate information in response to receiving the status event trigger in the signal at the first device, wherein the aggregate information comprises product status information and product identification information and further comprises product registration information associated with a registered user; and
  generating a visual code representative of the aggregate information at the first device.

16. The method of claim 15, further comprising transmitting the visual code to a display device for display to the user.

17. The method of claim 15, further comprising transmitting the visual code to a transmitter for transmission over a network to another device.

18. The method of claim 15, wherein recognizing the status event trigger for the product further comprises receiving an error signal from another device.

\* \* \* \* \*